July 30, 1963   J. J. WETZLER   3,099,518
METHOD OF MAKING AN INNERSPRING FOAM MATTRESS
Original Filed May 28, 1957   4 Sheets-Sheet 1

INVENTOR
Justin J. Wetzler

BY

ATTORNEYS

July 30, 1963 — J. J. WETZLER — 3,099,518

METHOD OF MAKING AN INNERSPRING FOAM MATTRESS

Original Filed May 28, 1957 — 4 Sheets-Sheet 2

INVENTOR
Justin J. Wetzler
BY
ATTORNEYS

July 30, 1963 J. J. WETZLER 3,099,518
METHOD OF MAKING AN INNERSPRING FOAM MATTRESS
Original Filed May 28, 1957 4 Sheets-Sheet 3
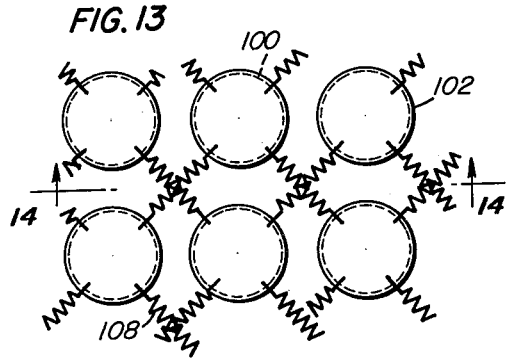
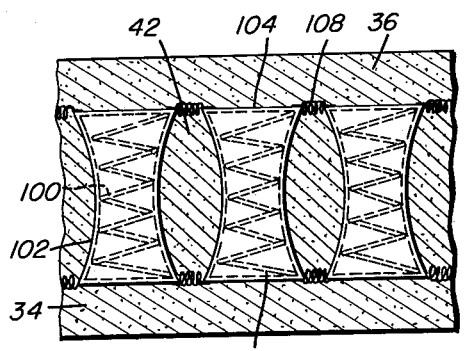
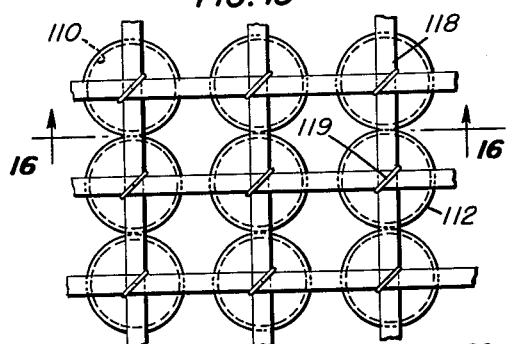
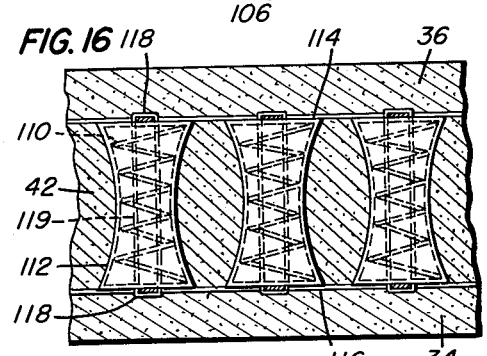
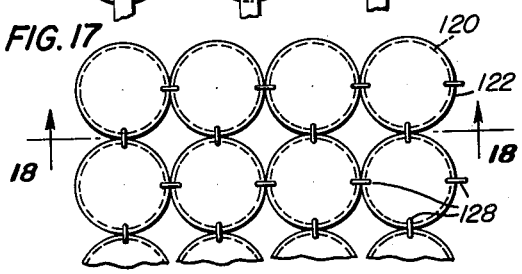
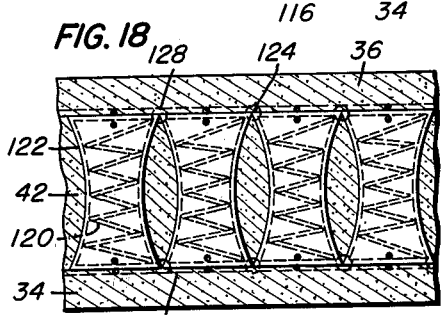
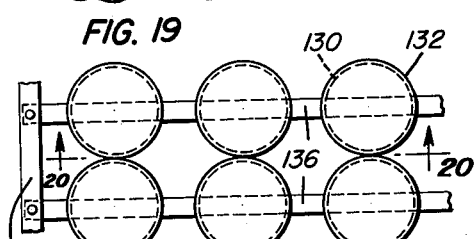
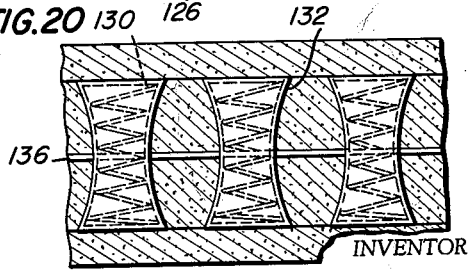
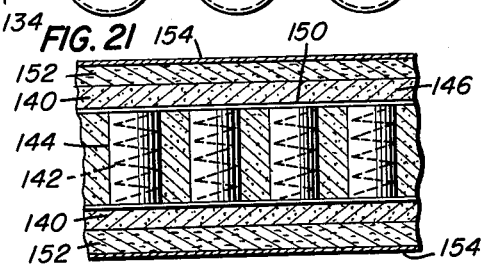
INVENTOR
Justin J. Wetzler
BY
ATTORNEYS

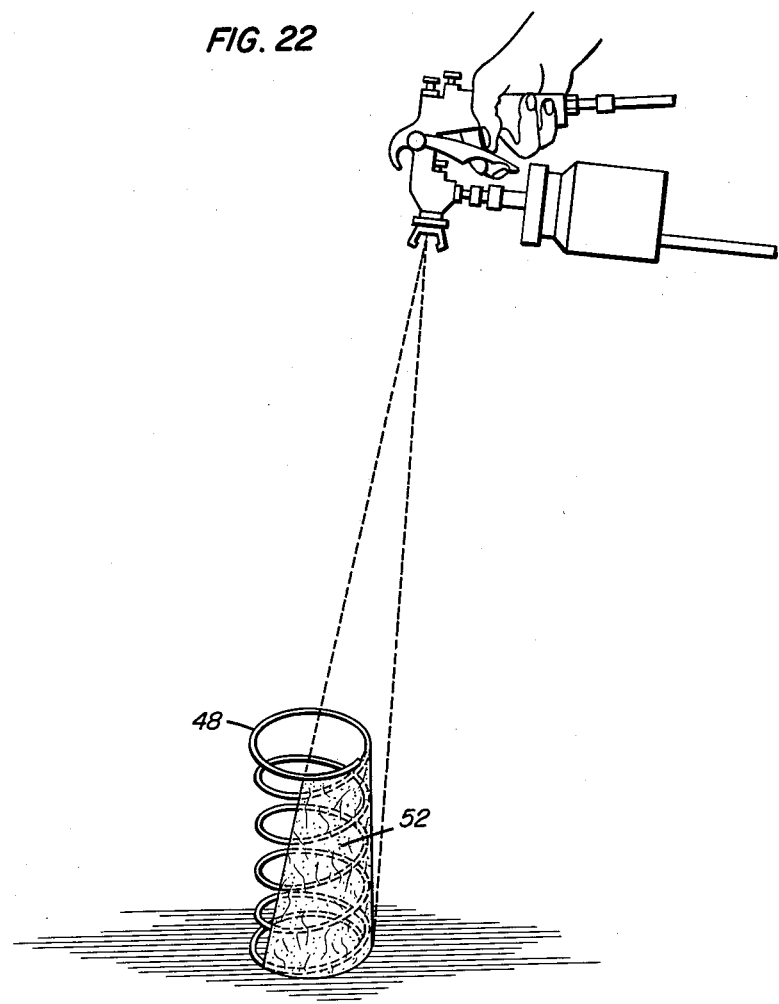

United States Patent Office 3,099,518
Patented July 30, 1963

3,099,518
METHOD OF MAKING AN INNERSPRING
FOAM MATTRESS
Justin J. Wetzler, Evanston, Ill., assignor to The Englander Company, Inc., Chicago, Ill., a corporation of Delaware
Original application May 28, 1957, Ser. No. 662,085. Divided and this application May 16, 1960, Ser. No. 41,462
5 Claims. (Cl. 18—59)

This invention relates to methods of making resilient mattresses, more particularly to methods of making resilient mattresses embodying a plurality of springs embedded in a resilient rubber-like foam structure.

This application is a division of prior application Serial No. 662,085 filed May 28, 1957, for Foam Mattresses.

The resilient rubber-like foam structure referred to hereinabove is suitably one of the conventional urethane foams prepared by the reaction of a polyisocyanate (usually, a diisocyanate) with an organic substance having a plurality of groups or radicals each containing reactive hydrogen, for instance, a polyester or a polyether or one of the substances disclosed in the patent to Hanford et al. No. 2,284,896. Note the article entitled "Polyethers for Urethane Foams" on page 78 of January 21, 1957, issue of Chemical and Engineering News. Methods of making specific foams are disclosed, for instance, in the patents to Simon et al. Nos. 2,577,279, 2,577,280, 2,591,884, 2,602,783, 2,698,838, and 2,764,566; in the patent to Hill No. 2,726,219; and in the patent to Reis No. 2,779,689. The chemical processes and reactions involved in the formation of urethane foams are well known to those skilled in the art and per se form no part of the present invention. Hence, no further reference will be made to the chemistry of urethane foams except to note, at this time, that urethane foams may be formed by mixing appropriate reactants and depositing the resultant mixture on a surface as a thin layer. Then a chemical reaction occurs accompanied by the evolution of gas. Thus, a layer originally one-half inch thick may foam up to a thickness of perhaps four inches. This foaming action may be completed within 3 or 4 minutes. Transformation of the originally liquid reactant mixture into a more or less resilient, rubber-like cellular solid takes place concurrently with the gas forming foaming reaction.

In making a mattress, pad or cushion according to the present invention, a spring structure is first provided. The individual springs of this spring structure are then each covered with a water resistant filmy plastic coating which externally bridges the convolutions of the individual springs, so that each individual spring is enclosed within a separate film envelope. Such coating compositions and spraying or dipping methods for applying the same are conventional and are well known to those skilled in the art. Examples are given, for instance, in the patents to Phillips et al. No. 2,394,101 and to Pineles No. 2,441,227. The compositions in question form per se no part of the present invention.

When the above noted spring structure has been provided with a protective film envelope around each individual spring, the spring structure is embedded within a urethane foam slap or layer. The resulting unitary structure may be used as such a mattress, pad or cushion. Or, if desired, other and further layers of padding may be provided therearound, and the structure may be enclosed within any desired cover or casing.

Other and further features of the present invention will become apparent from the following description and appended claims as illustrated by the accompanying drawings which show diagrammatically and by way of examples mattresses made according to the methods of the present invention.

FIG. 13 is a fragmentary plan view showing another plurality of coil springs interconnected to form a unit suitable for incoporation within a mattress;

FIG. 14 is a cross sectional view taken along the line 14—14 of FIG. 13 and shows a mattress incorporating the interconnected springs of FIG. 13;

FIG. 15 is a fragmentary plan view showing another set of coil springs interconnected for incorporation in a mattress;

FIG. 16 is a cross sectional view taken along the line 16—16 of FIG. 15 and shows a mattress incorporating the springs of FIG. 15;

FIG. 17 is a fragmentary plan view of a plurality of coil springs tied together preparatory to incorporation within a mattress;

FIG. 18 is a cross sectional view taken along the line 18—18 of FIG. 17 and shows a mattress incorporating the springs of FIG. 17;

FIG. 19 is a fragmentary plan view showing a plurality of coil springs interconnected preparatory to incorporation within a mattress;

FIG. 20 is a cross sectional view taken along the line 20—20 of FIG. 19 and shows a mattress including the springs of FIG. 19;

FIG. 21 is a longitudinal vertical cross sectional view similar to FIGS. 14, 16, 18 and 20 and showing a mattress similar to that made according to the methods of FIGS. 1–3 and including an outer layer of padding and a mattress cover or ticking; and FIG. 22 is a perspective view showing how the coil springs are enclosed within a plastic film envelope.

Figure 1:
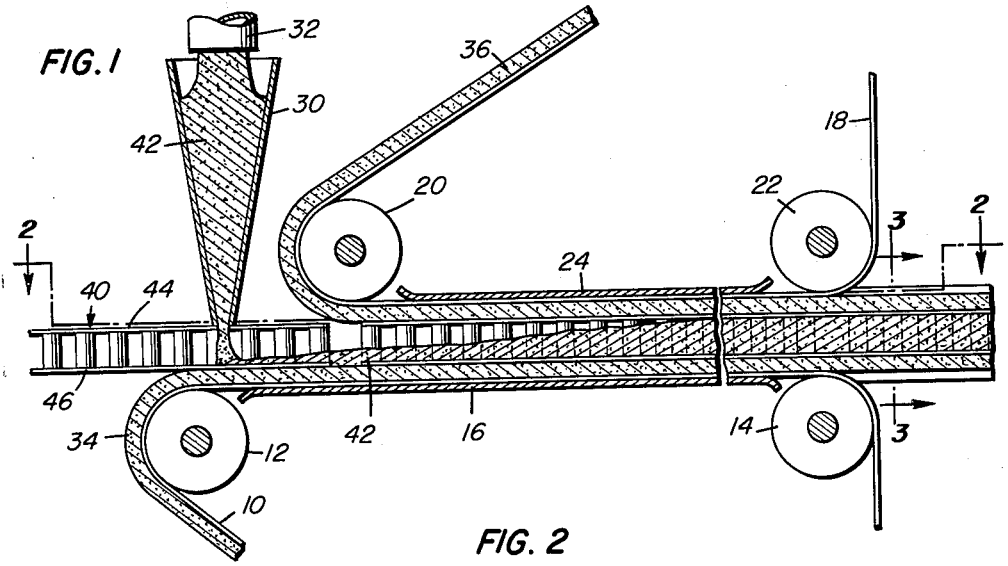
FIG. 1 is a vertical longitudinal cross sectional view taken along the line 1—1 of FIG. 2 and showing apparatus for making a mattress according to the present invention.
Figure 2:
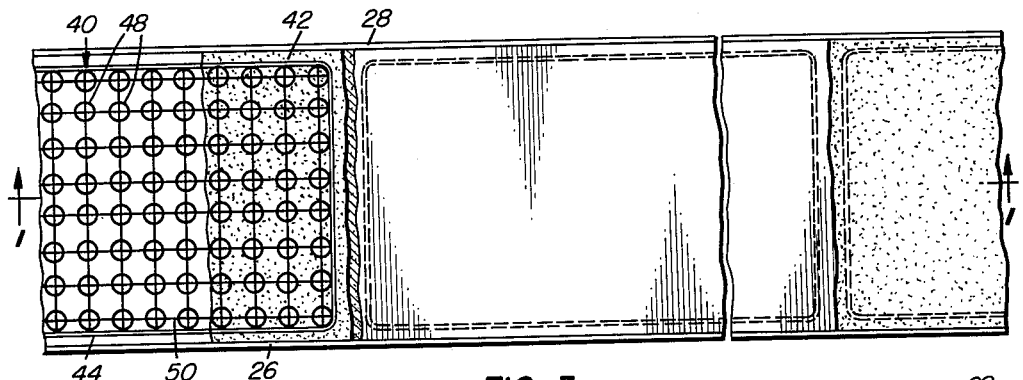
FIG. 2 is a cross sectional view taken along the line 2—2 of FIG. 1.
Figure 3:
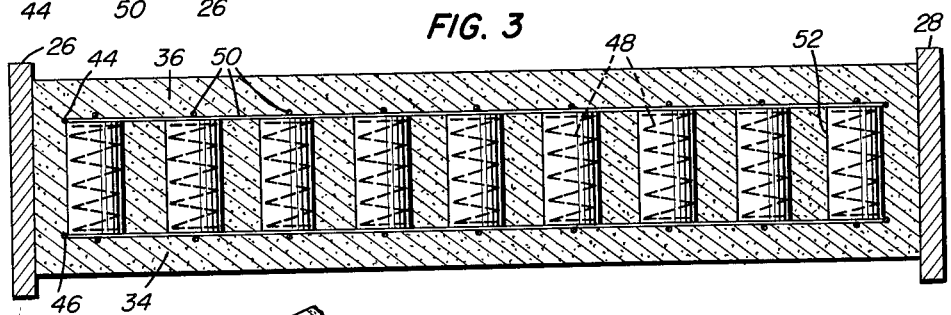
FIG. 3 is an enlarged fragmentary cross sectional view taken along the line 3—3 of FIG. 1.

Reference is now made to FIGS. 1–3 which show apparatus employed in the methods of the present invention including a lower belt 10 travelling over horizontal spaced rollers 12 and 14 and supported therebetween by a lower shoe 16. Suitable conventional means are provided for causing the belt 10 to travel from the left to the right.

An upper belt 18 moving over rollers 20 and 22 likewise is caused to move from the left to right by any suitable conventional means. The upper roller 22 is aligned vertically with the lower roller 14. The upper roller 20 is offset to the right with respect to the lower roller 12. A shoe 24 holds the horizontal portion of the belt 18 against upward displacement. A pair of vertical sidewalls members 26 and 28 serve to complete enclosure of the space between the lower belt 10 and the upper belt 18. A hopper 30 serves to discharge material received from a conduit 32 onto the lower belt 10 to the left of the roller 20.

In the operation of the apparatus of FIGS. 1–3, a strip of urethane foam rubber 34 is caused to travel along with the belt 10 over and above the horizontal reach of the latter belt and another strip 36 of urethane foam rubber is caused to travel along and below the horizontal reach of the belt 18. Sets of interconnected coil springs generally indicated at 40 are introduced between the urethane foam rubber strips 34 and 36 for travel therewith between the sidewalls or guides 26 and 28.

As shown in FIG. 1 each spring assembly 40 is initially disposed on the urethane foam strip 34. While the spring assembly 40 is in this position, a urethane foam forming mixture 42 is deposited on the strip 34 from the hopper 30. Originally, this more or less viscous but still liquid foam forming mixture 42 does not extend to the top of the spring assembly 40. However, as the latter travels from left to right, the formation of foam in mixture 42 causes the latter to rise to the top of the spring assembly 40 and into contact with the underside of the upper urethane foam strip 36. It will be noted that the lower rollers 12 and 14 and the upper rollers 20 and 22 are spaced apart so that the spring assembly 40 will fit exactly between the two urethane foam rubber strips 34 and 36, the latter being held in position by the two shoes 16 and 24.

Figure 5:
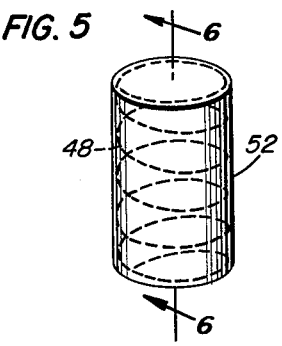
FIG. 5 is a perspective view of a coil spring enclosed within a plastic film envelope preparatory to incorporation with a mattress unit according to the method illustrated in FIGS. 1–3.
Figure 6:
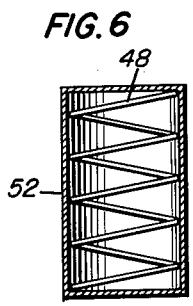
FIG. 6 is a cross sectional view taken along the line 6—6 of FIG. 5.

The spring assembly 40 includes upper and lower wire frames 44 and 46 extending therearound; a plurality of individual coil springs 48; and upper and lower sets of crossing or intersecting wires 50 interconnecting the coil springs 48 with each other and with the frames 44 and 46. Further, as shown in FIGS. 5 and 6, each individual coil spring 48 is enveloped by a film 52.

Figure 7:
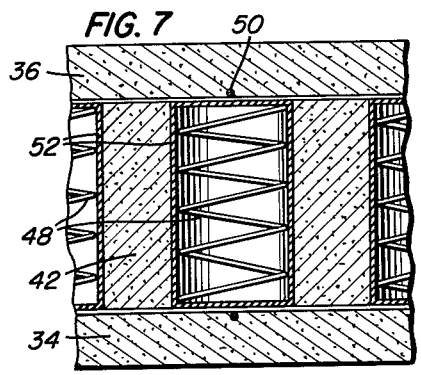
FIG. 7 is an enlarged fragmentary vertical cross sectional view through a mattress made according to the method of FIGS. 1–3 and including coils such as that illustrated in FIGS. 5 and 6.

The resulting mattress structure is illustrated in FIG. 7 as including coil springs 48 each individually enveloped by a film 52 and all interconnected to each other and to the frames 44 and 46 by means of crossing wires 50 to form a spring assembly 40 embedded within an integral urethane foam structure made up of the lower strip 34, the upper strip 36 and the material 42 deposited from the hopper 30 and, when completely polymerized, bonded to and connecting the two strips 34 and 36 to form therewith an integral foam structure.

It should be understood that the rubber strips 34 and 36 may be continuous so that as successive spring assemblies 40 are fed therebetween and foam forming liquid 42 is deposited on the lower strip 34, there is formed a continuous foam structure embedding successive spring assemblies 40 from which individual mattresses may be isolated by severing this structure between the spaced ends of the spring assemblies 40. However, if desired, it is also possible to make the foam strips 34 and 36 discontinuous, individual strip units being fed in pairs between the belts 10 and 18 in proper synchronization with spring assemblies 40 to form a continuous strip held together only by foam forming material 42 extending between the spaced ends of successive spring assemblies 40. Then, to isolate individual mattresses, it is only necessary to sever the connecting foam material 42 between the spaced ends of the spring assemblies 40.

Ordinarily, the spring assembly 40 is completely assembled from its constituent parts (coils 48, wires 50 and frames 44 and 46) and thereafter the coil springs 48 are dipped or sprayed with a film forming material to enclose each spring 48 within a filmy envelope 52. Such filmy envelope may be formed by the technique described in U.S. Patent 2,441,227. Such technique comprises directing, at a small angle tangential to the spring convolutions, a spray of comparatively long, comparatively dry adhesive filament across the space between the spring convolutions to progressively build up a bridging coating of a network of randomly oriented filaments and then spraying the bridging with wetter and smaller adhesive spray particles to form a continuous exterior sheath or unitary plastic envelope 52 around the spring coils 48.

Figure 4:
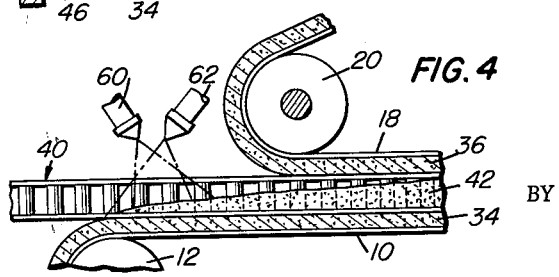
FIG. 4 is a fragmentary view similar to FIG. 1 and showing a modification of one detail in the apparatus of FIG. 1.

The foam forming material 42 can be deposited on the spring assembly 40 and the lower foam strip 34 by any suitable conventional means. As shown in FIG. 4, such deposition of foam forming material may also be effected by means of a pair of spray nozzles 60 and 62 each serving to deposit, in one and the same area, for mutual admixture, two components which when mixed constitute a foaming urethane forming composition.

Any desired conventional type of spring assembly adapted for use in a mattress, pad or cushion may be embedded within a urethane foam structure utilizing the apparatus and method disclosed hereinabove. Reference is made to FIGS. 8–20 as showing mattresses, pads or cushions including various types of conventional spring assemblies embedded within an integral urethane foam structure, each individual coil spring in said assemblies being enclosed within an individual filmy envelope.

Figure 8:
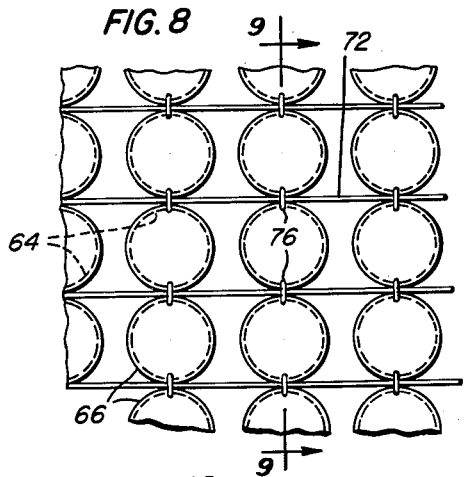
FIG. 8 is a fragmentary plan view showing a plurality of coil springs interconnected to form a unit suitable for interconnecting within a mattress.
Figure 9:
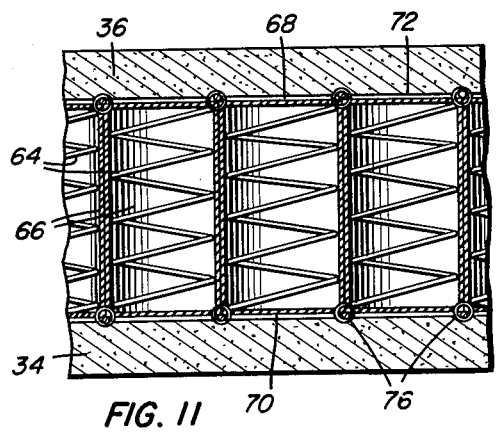
FIG. 9 is a fragmentary cross sectional view taken along the line 9—9 of FIG. 8 and shows a mattress incorporating the interconnected springs of FIG. 8.

As shown in FIGS. 8 and 9, a plurality of coil springs 64, each enclosed within a filmy envelope 66, are held in assembled relationship within upper and lower wire frames 68 and 70 by means of longitudinally extending wires 72. The springs 64 are arranged in spaced rows, the springs in each row being close together. The wires 70 extend transversely of these rows of springs. Short wires 76 tie the springs 64 to the wires 72.

Figure 10:
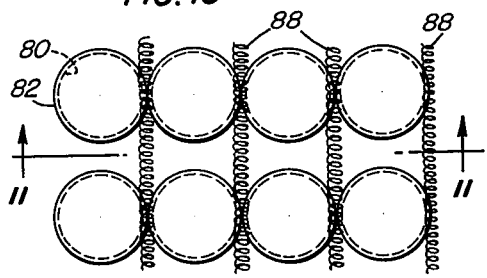
FIG. 10 is a view similar to FIG. 8 but shows a spring unit of slightly different construction.
Figure 11:
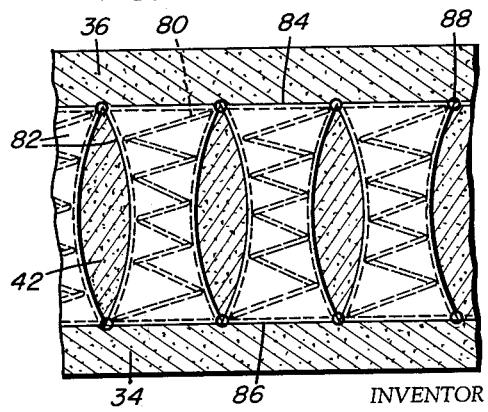
FIG. 11 is a fragmentary cross sectional view taken along the line 11—11 of FIG. 10 and shows a mattress incorporating the spring unit of FIG. 10.

FIGS. 10 and 11 illustrate hour glass shaped coil springs 80 each enveloped by an individual film 82 and held within upper and lower wire frames 84 and 86 by means of wire coils 88 engaging pairs of closely spaced coils 80 which are arranged similarly to the coils 64 of FIG. 8.

Figure 12:
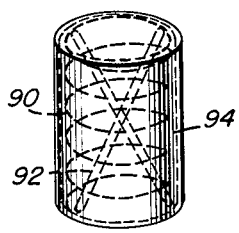
FIG. 12 is a perspective view of a coil spring held in slightly compressed condition and enclosed within a plastic envelope preparatory to incorporation with a mattress.

FIG. 12 shows a coil spring 90 of barrel shape held in slightly compressed state by means of a tape 92 crisscrossing through the center of the coil and extending vertically along opposite sides of the coil. This structure is enclosed within a filmy envelope 94 and may be assembled into spring assemblies similarly to the coil 48 of FIGS. 5 and 6.

FIGS. 13 and 14 show hour glass shaped springs 100 each enclosed within a filmy envelope 102 and held within upper and lower frames 104 and 106 by means of crossing pieces of wire coil 108 extending between diagonally opposed adjacent coils 100.

FIGS. 15 and 16 show hour glass shaped coil springs 110 each enclosed within a filmy envelope 112 and held in assembled relationship within upper and lower frames 114 and 116 by means of intersecting upper and lower tapes 118. The springs 110 are held in slightly compressed state by looped wires 119 extending within the center of each spring 110 between the upper and lower tapes 118.

FIGS. 17 and 18 show hour glass shaped coils 120 each enclosed within a filmy envelope 122 and all held in closely spaced assembled relationship within upper and lower frames 124 and 126 by short pieces of wire 128 tying the coils 120 together.

FIGS. 19 and 20 show hour glass shaped coils 130 each enclosed within a filmy envelope 132 and all held in spaced assembled relationship within a frame 134 extending at about a middle level by steel tapes 136.

FIG. 21 shows a mattress including an integral urethane foam structure 140 and coil springs 142 each enclosed within a filmy envelope 144 embedded within the foam structure 140 and held in assembled relationship within upper and lower frames 146 and 148 by intersecting wires 150. The mattress further includes padding 152 and an outer cover or ticking 154.

Many details may be varied without departing from the principles of this invention and it is therefore not my intention to limit the patent granted on this invention otherwise than necessitated by the scope of the appended claims.

The invention is claimed as follows:

1. A method of making a resilient mattress which comprises providing a plurality of coil springs in a predetermined pattern with spaces therebetween, enclosing each of said coil springs with individual filmy plastic envelopes, and thereafter embedding the coil springs within a pad of resilient cellular material, said last mentioned step including forming portions of the resilient cellular material in said spaces between the springs so that said portions of the resilient cellular material intimately conform to the filmy envelopes enclosing the springs.

2. A method of making a resilient mattress which comprises providing unidirectionally moving first and second spaced parallel strips of resilient cellular material, providing a plurality of coil springs, enclosing each coil spring within a filmy envelope, thereafter disposing said coil springs on said first strip, superposing said second strip on said coil springs, and during movement of the strips filling the empty space between said strips and the films around said springs with material yielding resilient cellular material bonded to said strips.

3. A method according to claim 2 in which said cellular material is flexible urethane foam.

4. A method according to claim 2 comprising the further step of interconnecting said coil springs before disposing said springs on said first strip but after each spring has been enclosed within a filmy flexible envelope.

5. A method of making an innerspring foam mattress which comprises encasing each of a series of springs within a unitary flexible plastic sheath, interconnecting the plastic-encased springs with each other and with a frame to form a spring assembly; providing upper and lower continuously and unidirectionally moving spaced parallel strips of resilient cellular material, continuously disposing successive spring assemblies on the said lower strip of cellular material, continuously flowing a liquid foamable composition onto said lower strip, foaming said composition in situ between said moving upper and lower strips and between said plastic-encased springs and continuously severing the resulting structure between spaced ends of said successive spring assemblies.

References Cited in the file of this patent

UNITED STATES PATENTS

| | | |
|---|---|---|
| Re. 24,914 | Koenigsberg | Dec. 20, 1960 |
| 2,161,080 | Murphy et al. | June 6, 1939 |
| 2,247,543 | Bernstein | July 1, 1941 |
| 2,398,237 | Marsack | Apr. 6, 1946 |
| 2,415,765 | Schmidt | Feb. 11, 1947 |
| 2,434,209 | Glazier | Jan. 6, 1948 |
| 2,446,775 | Marsack | Aug. 10, 1948 |
| 2,576,073 | Kropa et al. | Nov. 20, 1951 |
| 2,744,042 | Pace | May 1, 1956 |
| 2,753,642 | Sullivan | July 10, 1956 |
| 2,882,959 | Burkart | Apr. 21, 1959 |
| 2,927,876 | Hoppe et al. | Mar. 8, 1960 |
| 2,983,636 | Runton | May 9, 1961 |
| 2,994,890 | Wagner | Aug. 8, 1961 |

FOREIGN PATENTS

| | | |
|---|---|---|
| 577,705 | Great Britain | Mar. 29, 1946 |
| 842,267 | Germany | Sept. 15, 1952 |